(12) United States Patent
Maia et al.

(10) Patent No.: US 9,364,988 B2
(45) Date of Patent: Jun. 14, 2016

(54) LAYER MULTIPLYING DIE FOR GENERATING INTERFACIAL SURFACES

(75) Inventors: Joao Maia, Shaker Heights, OH (US);
Jorge Silva, Shaker Heights, OH (US);
Patrick Harris, Cleveland, OH (US)

(73) Assignee: Case Western Reserve University, Cleveland, OH (US)

( * ) Notice: Subject to any disclaimer, the term of this patent is extended or adjusted under 35 U.S.C. 154(b) by 791 days.

(21) Appl. No.: 13/424,023

(22) Filed: Mar. 19, 2012

(65) Prior Publication Data

US 2012/0235319 A1    Sep. 20, 2012

Related U.S. Application Data

(60) Provisional application No. 61/453,605, filed on Mar. 17, 2011.

(51) Int. Cl.
*B29C 45/16* (2006.01)
*B29C 47/06* (2006.01)
*B29C 47/70* (2006.01)
*B29C 47/00* (2006.01)
*B29C 47/92* (2006.01)

(52) U.S. Cl.
CPC .............. *B29C 47/06* (2013.01); *B29C 47/702* (2013.01); *B29C 47/707* (2013.01); *B29C 47/0021* (2013.01); *B29C 47/92* (2013.01); *B29C 2947/92514* (2013.01)

(58) Field of Classification Search
CPC .... B29C 47/70; B29C 47/702; B29C 47/707; B29C 47/0021; B29C 47/06; B29C 47/92; B29C 2947/92514

USPC ............... 264/171.16, 173.15, 177.16, 328.8, 264/328.12; 425/131.1, 133.5, 462, 463
See application file for complete search history.

(56) References Cited

U.S. PATENT DOCUMENTS

| | | | |
|---|---|---|---|
| 5,843,350 A * | 12/1998 | Maeda et al. | 264/40.5 |
| 8,388,331 B2 * | 3/2013 | Osada | B29C 47/0021 264/173.16 |
| 9,108,218 B2 * | 8/2015 | Oliver | B05D 5/06 |
| 2008/0067712 A1 * | 3/2008 | Osada | B29C 47/0021 264/171.1 |
| 2010/0140832 A1 * | 6/2010 | Ashimoto | B29C 47/0033 264/173.12 |
| 2010/0239700 A1 * | 9/2010 | Winroth | 425/131.1 |
| 2011/0272849 A1 * | 11/2011 | Neavin | B29C 47/0021 264/173.11 |

* cited by examiner

*Primary Examiner* — Yogendra Gupta
*Assistant Examiner* — Emmanuel S Luk
(74) *Attorney, Agent, or Firm* — Tarolli, Sundheim, Covell & Tummino LLP

(57) ABSTRACT

A method for generating interfacial surfaces within a first composite stream having a generally planar layer interface lies generally in an x-z plane of an x-y-z coordinate system. The method includes dividing the first composite stream into a plurality of branch streams along the x-axis such that the pair of discrete overlapping layers and the generally planar layer interface are distributed among at least two branch streams. Within each individual branch stream of the at least two branch streams, the width dimension of the branch stream is expanded along the x-axis and the thickness dimension of the branch stream is simultaneously contracted along the y-axis. The branch streams are recombined in an overlapping relationship, after each of the at least two branch streams is simultaneously expanded and contracted, to form a second composite stream having a greater number of discrete overlapping layers of polymeric material than the first composite stream.

21 Claims, 5 Drawing Sheets

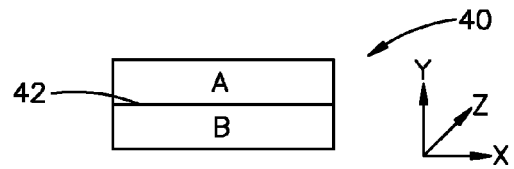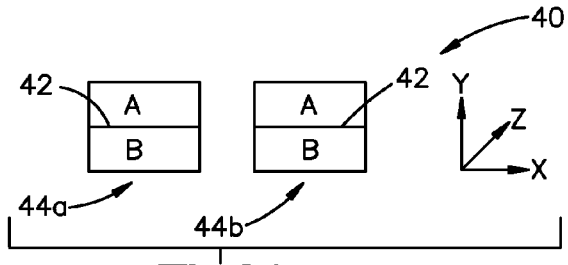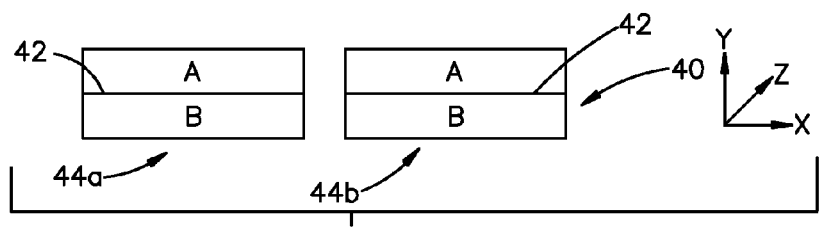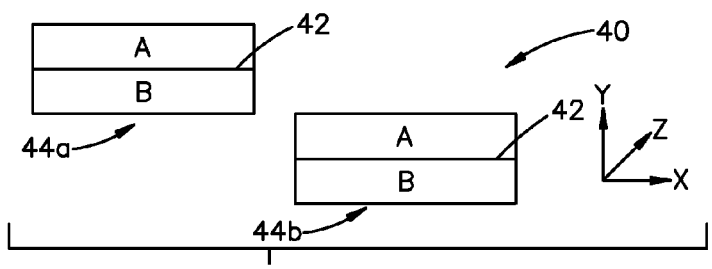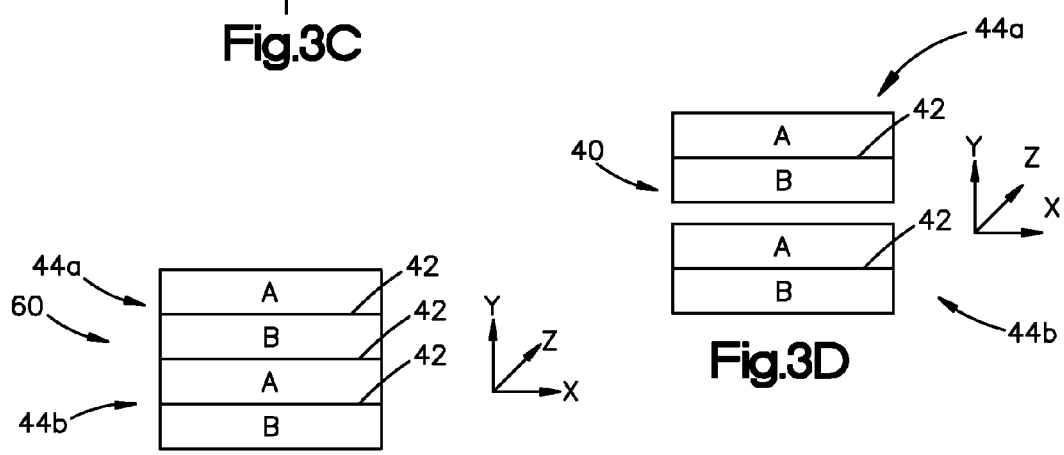

LAYER MULTIPLYING DIE FOR GENERATING INTERFACIAL SURFACES

RELATED APPLICATION

This application claims priority from U.S. Provisional Application No. 61/453,605, filed Mar. 17, 2011, the subject matter of which is incorporated herein by reference in its entirety.

GOVERNMENT FUNDING

This invention was made with government support under Grant No. RES504775 awarded by The National Science Foundation. The United States government may have certain rights to the invention.

TECHNICAL FIELD

The invention relates to a multiplying die and, in particular, relates to a multiplying die that generates interfacial surfaces between overlapping layers of polymeric material.

BACKGROUND

Co-extrusion through a series of layer multiplying die elements enables the production of films containing hundreds and even thousands of layers, with individual layer thickness varying from the microscale to the nanoscale. This results in the production of novel systems with improved properties. In fact, layered polymer films with micron and sub-micron-thick layers have seen increasing usage in composite films for packaging with improved gas barrier and increased mechanical toughness. Commercialized technologies stemming from layered polymer films with unique optical properties include highly reflective light filters and polarizers.

One exemplary layer multiplying die currently used was developed by The Dow Chemical Company of Midland, Mich. Later optimizations of the Dow design as well as polymer selection via rheology matching and incorporation of polymeric surface layers has led to improvements in layer uniformity. However, even after the more recent optimizations of the layer multiplier die design, the layer uniformity and continuity strongly depends on the viscosities of the individual layered components. Poor viscosity matching normally results in the lower viscosity polymer encapsulating the other by forming a slip film between the higher viscosity polymer and the multiplier die wall. It is also known that normal stress differences can cause layer instability and breakup during layer multiplication. The above means that currently good layer uniformity and continuity can only be achieved for a relatively low range of materials. In general, the current layer multiplying dies cannot be used to obtain products with enhanced properties when the differences between the viscosities of the individual layered components and/or their elasticities are relatively high.

In the present invention, a new multiplier die is provided that is capable of broadening the range of polymers that can be layered in order to obtain products with enhanced properties. This new multiplier die allows for film production with good layer uniformity and continuity even when the differences between the viscosities and/or polymer elasticities are relatively high.

SUMMARY OF THE INVENTION

In accordance with the present invention, a method is provided for generating interfacial surfaces within a first composite stream having discrete overlapping layers of polymeric material. A pair of such discrete overlapping layers defines a generally planar layer interface therebetween lying generally in an x-z plane of an x-y-z coordinate system. The z-axis extends in the general direction of flow of the first composite stream. The x-axis extends transversely of the first composite stream and defines a width dimension of the first composite stream and the pair of discrete overlapping layers. The y-axis extends perpendicularly away from the planar layer interface and defines a thickness dimension of the first composite stream and the discrete overlapping layers. The method includes dividing the first composite stream into a plurality of branch streams along the x-axis such that the pair of discrete overlapping layers and the generally planar layer interface defined therebetween are distributed among at least two of the branch streams. Within each individual branch stream of the at least two branch streams, the width dimension of the branch stream is expanded along the x-axis and the thickness dimension of the branch streams is simultaneously contracted along the y-axis. The branch streams are recombined, after simultaneously expanding and contracting each of the at least two branch streams, in an overlapping relationship to form a second composite stream that has a greater number of discrete overlapping layers of polymeric material than the first composite stream.

In accordance with another aspect of the present invention, a die for multiplying a planar layer interface between discrete overlapping polymeric layers of a first composite stream is provided. The planar layer interface lies generally in an x-z plane of an x-y-z coordinate system. The z-axis extends in the general direction of flow of the first composite stream, the x-axis extends transversely of the first composite stream and defines a width dimension of the first composite stream and the discrete overlapping layers, and the y-axis extends perpendicularly away from the planar layer interface and defines a thickness dimension of the first composite stream and the discrete overlapping layers. The die includes a first sub-element having conduits for dividing the composite stream into branch streams. A second sub-element has tapered conduits for simultaneously expanding each branch stream along the x-axis and contracting each branch stream along the y-axis. A third sub-element has conduits for recombining the branch streams, after simultaneously expanding and contracting each branch stream, in an overlapping relationship to form a second composite stream having a greater number of discrete overlapping layers of polymeric material than the first composite stream.

Other objects and advantages and a fuller understanding of the invention will be had from the following detailed description of the preferred embodiments and the accompanying drawings.

BRIEF DESCRIPTION OF THE DRAWINGS

FIG. 2 is a schematic illustration of a first composite stream that enters the multiplier die of FIG. 1;

FIGS. 3A-4 illustrate cross-sections of the first composite stream as it passes through sub-elements of the multiplier die of FIG. 1;

DETAILED DESCRIPTION

Figure 1:
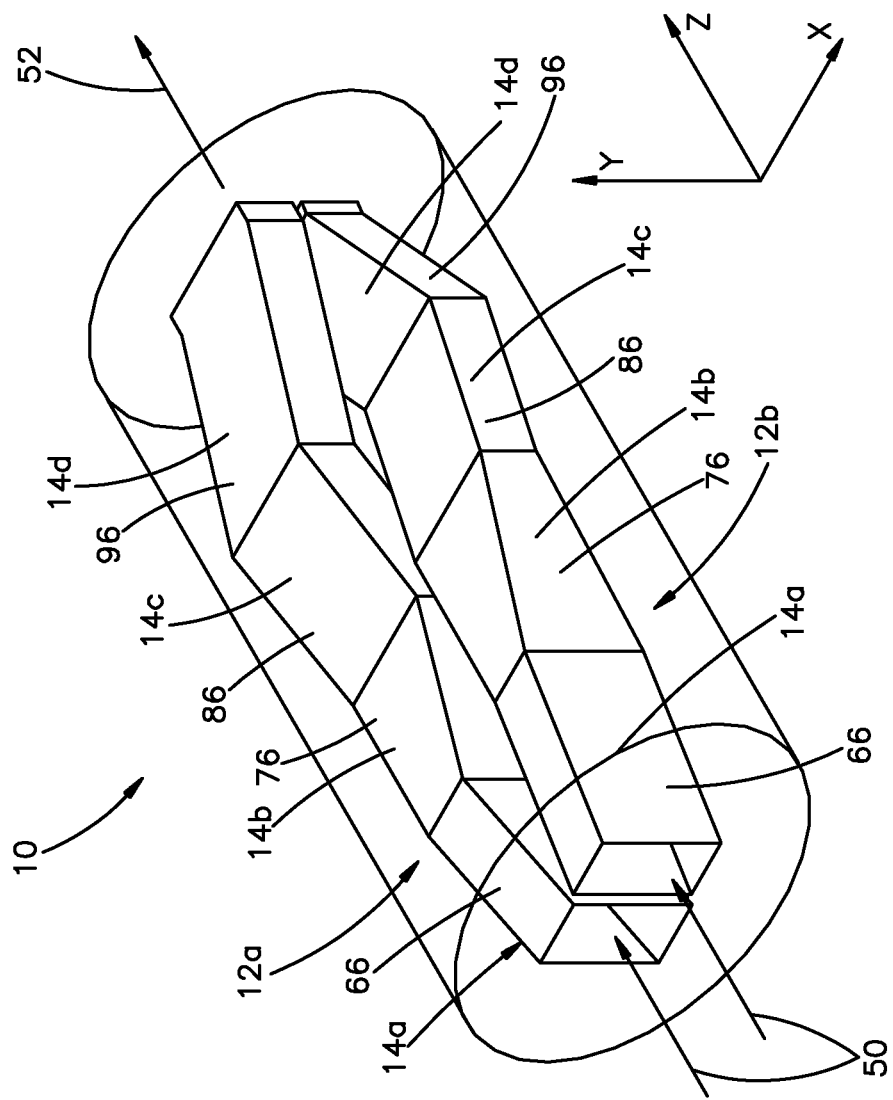
FIG. 1 is a schematic illustration of a multiplier die in accordance with an embodiment of the present invention.

The invention relates to a multiplying die and, in particular, relates to a multiplying die that generates interfacial surfaces between overlapping layers of polymeric material. One exemplary multiplying die 10 in accordance with the present invention is illustrated in FIG. 1. Although a single multiplier die 10 is illustrated, it will be understood that multiple dies may be used in series and/or in parallel in accordance with the present invention.

The die 10 includes two or more discrete material flow paths 12a, 12b for modifying composite streams of material. Each material flow path 12a, 12b includes four functionally distinct but not necessarily physically separable sub-elements, namely, 1) one sub-element 14a for dividing a first composite stream into branch streams and redirecting the branch streams, 2) one sub-element 14b for expanding the branch streams in one direction while simultaneously contracting the branch streams in another direction, 3) one sub-element 14c for repositioning the expanded/contracted branch streams, and 4) one sub-element 14d for recombining the branch streams into a second, different composite stream. The sub-elements 14a-d may be directly or indirectly connected to one another.

As shown in FIG. 2, a layered first composite stream 40 for use in the multiplier die 10 includes two discrete and continuous layers (A) and (B) of diverse thermoplastic materials that might, for example, proceed from a conventional co-extrusion feedblock. It is to be understood that a "conventional co-extrusion feedblock" embraces a multilayer feedblock, such as disclosed in U.S. Pat. No. 3,773,882 to Schrenk. The first composite stream 40 could include a number of layers and materials substantially exceeding the two layers shown in FIG. 2. Additional layers for the first composite stream 40 may constitute layers (A) or (B) or layers formed from material(s) that are different from the materials of the layers (A) and (B). The illustrated two-layer first composite stream 40 has been selected, however, in the interest of simplifying as much as possible the explanation and description of the present invention.

The layered first composite stream 40 defines a planar layer interface 42 between the layers (A) and (B) which lies generally in the x-z plane of an x-y-z coordinate system. The z-direction corresponds to the direction of fluid flow generally through the multiplier die 10 (shown by the arrows 50 in FIG. 1). The x-direction defines a dimension that extends transverse to the interface 42 and the layers (A) and (B), i.e., the width of the layers (A) and (B). The y-direction lies in the thickness direction of the layers (A) and (B) and extends generally perpendicularly away from the planar layer interface 42.

After exiting the feedblock, the first composite stream 40 enters the leading or upstream end of the first sub-elements 14a of the die 10. Upon entering the first sub-elements 14a the first composite stream 40 is divided generally along the x-axis such that the planar layer interface 42 splits into two or more branch streams 44a, 44b. The number of splits and, thus, the number of first sub-elements 14a depends on the extent of the layers (A) and (B) and, thus, depends on the extent of the layer interface 42 in the x-direction. The layer interface 42 may be evenly or unevenly split by the first sub-elements 14a and, thus, the branch steams 44a, 44b may be identical or may be different from one another. In the illustrated embodiment of FIG. 2, the layers (A) and (B) span the first composite stream 40 and, thus, the layer interface 42 is divided evenly among each of the branch streams 44a, 44b. In this case, each branch stream 44a, 44b flows through a respective flow path 12a, 12b of the multiplier die 10.

Referring to FIG. 3A, in the first sub-elements 14a, the branch streams 44a, 44b are redirected and repositioned with respect to the x-axis as the branch streams travel downstream in the z-direction. As a result, the branch streams 44a, 44b become spaced further from one another along the x-axis at the exit of the first sub-elements 14a than at the entry of the first sub-elements. Accordingly, the first sub-elements 14a diverge away from one another relative to the x-axis as the first sub-elements extend along the z-axis from an upstream position to a downstream position.

Referring to FIG. 3B, in the second sub-elements 14b, each branch stream 44a, 44b undergoes a progressive, symmetric expansion along the x-axis, i.e., each branch stream becomes wider, while simultaneously undergoing a symmetric contraction along the y-axis, i.e., each branch stream becomes thinner, as the branch streams flow along the z-axis. The branch streams 44a, 44b thereby individually undergo simultaneous, bi-directional expansion and contraction. Each branch stream 44a, 44b expands along the x-axis by a factor that is proportionate to the degree of contraction of each branch stream along the y-axis. For example, the width of each branch stream 44a, 44b and, thus, the width of each layer interface 42, along the x-axis doubles over the length of the second sub-element 14b along the z-axis while the height of each breach stream along the y-axis is halved. In other words, the degree of expansion of each branch stream 44a, 44b is inversely proportional to the degree of contraction of each branch stream. Alternatively, the branch streams 44a, 44b may undergo expansion along the x-axis that is inversely disproportionate to the degree of contraction along the y-axis in accordance with the present invention (not shown). Regardless, the bi-directional modification of the cross-section, i.e., height and width, of each branch stream 44a, 44b occurs simultaneously over the length of the second sub-elements 14b in the z-direction (see FIG. 3B). Although FIG. 3B illustrates that expansion and contraction occurs evenly or uniformly from branch stream 44a to branch stream 44b, it will be understood that the ratio of expansion to contraction for each branch stream may vary between branch streams (not shown).

At the exit of the second sub-elements 14b, the branch streams 44a, 44b enter the third sub-elements 14c where they are repositioned along the y-axis relative to one another as the branch streams travel downstream in the z-direction (FIG. 3C). The third sub-elements 14c do not change the width or height dimensions of either branch stream 44a, 44b but merely change the spacing of the branch streams in the y-direction. In other words, at the entry of the third sub-elements 14c the branch streams 44a, 44b have a first relative position, e.g., the same position along the y-axis, and at the exit of the third sub-elements the branch streams are spaced from one another along the y-axis. The branch streams 44a, 44b are moved to positions along the y-axis in which the branch streams do not overlap one another in the y-direction.

At the exit of the third sub-elements 14*c*, the branch streams 44*a*, 44*b* enter the fourth sub-elements 14*d* where they are repositioned along both the x-axis and the y-axis relative to one another as the branch streams travel downstream in the z-direction (FIG. 3D) and recombined to form a layered second composite stream 60 (FIG. 4). The bi-directional repositioning of the branch streams 44*a*, 44*b* occurs simultaneously such that each branch stream moves in both the x-direction and y-direction as the branch streams flow downstream along the z-axis. In other words, at the entry of the fourth sub-elements 14*d* the branch streams 44*a*, 44*b* have a first relative position in the x-direction, e.g., spaced from one another along the x-axis, and at the exit of the fourth sub-elements the branch streams have a second relative position in the x-direction, e.g., the same position along the x-axis. The fourth sub-elements 14*d* therefore converge towards one another relative to the x-axis as the fourth sub-elements extend along the z-axis. Furthermore, at the entry of the fourth sub-elements 14*d* the branch streams 44*a*, 44*b* have a first relative position in the y-direction, e.g., spaced a first distance from one another along the y-axis, and near the exit of the fourth sub-elements the branch streams have a second relative position in the y-direction, e.g., spaced a second, smaller distance from one another along the y-axis. Placing the branch streams 44*a*, 44*b* in this stacked, aligned configuration along the y-axis allows the branch streams to be recombined to form a layered second composite stream 60 as the branch streams exit the fourth sub-elements 14*d* (see FIG. 4). The second composite stream 60 then exits the multiplier die 10 as indicated generally by the arrow 52 in FIG. 1.

The second composite stream 60 possesses more of the layers (A) and (B) than the first composite stream 40 and, thus, more of the interface layers 42 than the first composite stream entering the die (see FIG. 2). As illustrated in FIG. 4, the second composite stream 60 includes three interface layers 42, which is more than the single interface layer possessed by the first composite stream 40. The multiplier die 10 of the present invention thereby multiplies the number of interface layers 42 of the first composite stream 40 to form a second composite stream 60 with a desired number of interface layers.

Figure 5:
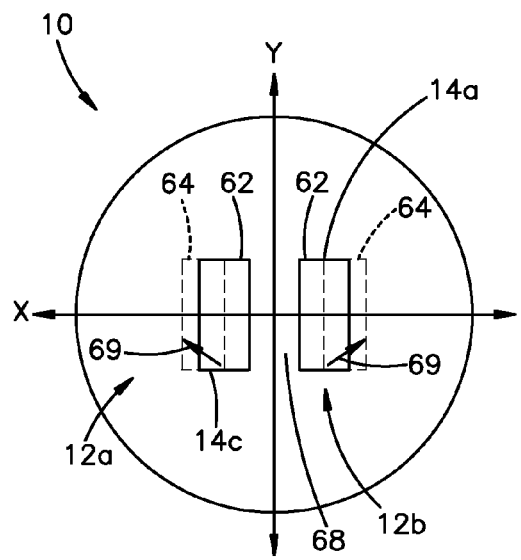
FIG. 5 is a cross-sectional view in isolation of a first sub-element of the die of FIG. 1, taken from the front or upstream side of the first sub-element.

More details of the entry and exit configurations of the sub-elements 14*a-d* that form the flow paths 12*a*, 12*b* of the present invention are illustrated in FIGS. 5-8. As shown in FIG. 5, each first sub-element 14*a* includes an inlet opening 62, an outlet opening 64, and a conduit 66 (see FIG. 1) that extends from the inlet opening to the outlet opening. The inlet openings 62 have substantially identical rectangular or square cross-sections and are aligned generally along the x-axis, i.e., have the same y-position, in the previously-defined x-y-z coordinate system. The inlet openings 62 therefore have the same position along both the y-axis and z-axis. The conduits 66 and outlet openings 64 are also substantially identical in true cross-section to one another and to the rectangular or square inlet openings 62. The conduits 66 have substantially the same length along the z-axis and, thus, the outlet openings 64 have the same position along the y-axis and z-axis. The two inlet openings 62 are defined by a dividing wall portion 68 that divides the first composite stream 40 of FIG. 2 received from the feedblock into the two separate branch streams 44*a*, 44*b* for entry into the inlet opening 62 of each first sub-element 14*a*. Those having ordinary skill in the art will appreciate that the multiplier die 10 of the present invention includes additional dividing portions 68 if it is desirable to divide the first composite stream 40 into more than two branch streams 44*a*, 44*b*.

The branch streams 44*a*, 44*b* in the first sub-elements 14*a* proceed from the inlet openings 62 through the conduits 66. The conduits 66 act as means for redirecting or repositioning each of the branch streams 44*a*, 44*b* with respect to the x-axis only. The general direction and degree of displacement associated with each conduit 66 is indicated by the arrows 69 in FIG. 5. The repositioning of the branch streams 44*a*, 44*b* along the x-axis by the conduits 66 of the first sub-elements 14*a* is effected without substantially changing or distorting the cross-sections of the various branch streams. More specifically, each branch stream 44*a*, 44*b* is repositioned along the x-axis without changing its shape into, for example, a parallelogram. The redirected and repositioned branch streams 44*a*, 44*b* arrive at the outlet openings 64 of the first sub-elements 14*a* with different positions along the x-axis relative to the positions of the branch streams at the inlet openings 62. The y-axis positions of the branch streams 44*a*, 44*b* remain unchanged between the inlet openings 62 and the outlet openings 64.

Figure 6:
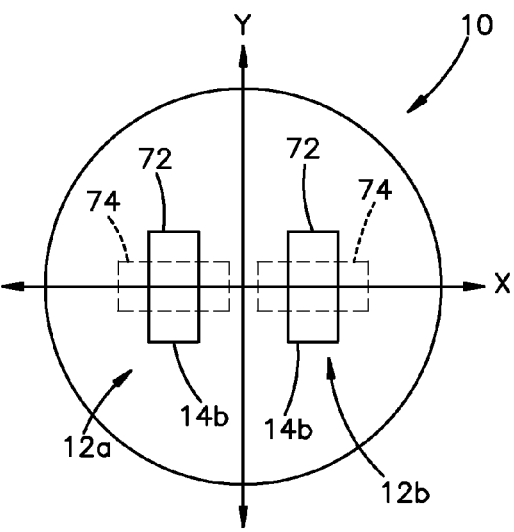
FIG. 6 is a cross-sectional view in isolation of a second sub-element of the die of FIG. 1, taken from the front or upstream side of the second sub-element.

The conduits 66 of the first sub-elements 14*a* connect to conduits 76 of the second sub-elements 14*b*. More specifically, the outlet openings 64 of the first sub-elements 14*a* communicate with inlet openings 72 of the second sub-elements 14*b* (FIG. 6). The inlet openings 72 of the second sub-elements 14*b* are substantially identical to the outlet openings 64 of the first sub-elements 14*a* and to one another. The conduits 76 taper in the x and y-directions (see FIG. 1) to effect simultaneous, bi-directional manipulation of each branch stream 44*a*, 44*b*. More specifically, the conduits 76 are substantially identically configured to one another in cross-section so as to simultaneously accomplish a uniform expansion of each branch stream 44*a*, 44*b* in the x-direction and a uniform contraction of each branch stream in the y-direction. Each conduit 76 therefore tapers outwardly in the x-direction as the conduit extends in the z-direction while simultaneously tapering inwardly in the y-direction. Since the simultaneous expansion and contraction of the branch streams 44*a*, 44*b* in x and y-directions, respectively, is symmetric, each conduit 76 tapers symmetrically in the x and y-directions along the z-axis. Accordingly, the cross-sectional area of each conduit 76 is substantially constant along its entire length in the z-direction.

Due to this construction of the conduits 76, after passing through the outlet openings 64 of the first sub-elements 14*a* and into the inlet openings 72 of the second sub-elements 14*b*, the branch streams 44*a*, 44*b* are progressively, symmetrically, and simultaneously expanded in their width (x) dimension and contracted in their thickness (y) dimension by passage through the conduits towards the outlet openings 74 of the second sub-elements. As noted, the degree of expansion of the branch streams 44*a*, 44*b* in the x-direction is inversely proportional to the degree of contraction in the y-direction. Accordingly, each branch stream 44*a*, 44*b* maintains a substantially constant cross-sectional area as the branch streams flow through the conduits 76.

Figure 7:
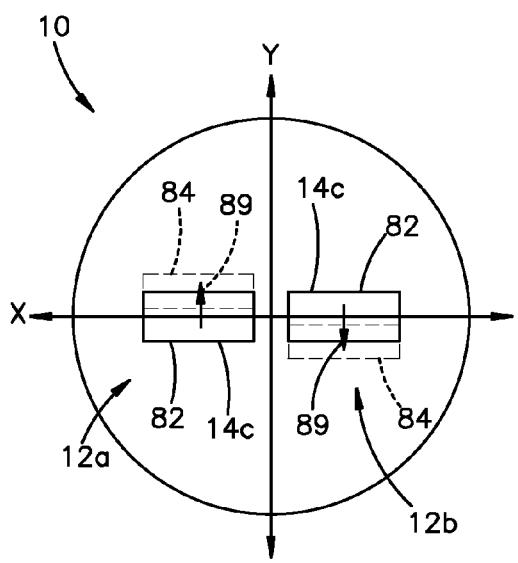
FIG. 7 is a cross-sectional view in isolation of a third sub-element of the die of FIG. 1, taken from the front or upstream side of the third sub-element.

Referring now to FIG. 7, the branch streams 44*a*, 44*b* flow through the outlet openings 74 of the second sub-elements 14*b* to inlet openings 82 of the third sub-elements 14*c*. Conduits 86 (see FIG. 1) connect the inlet openings 82 to outlet openings 84. The inlet openings 82 of the third sub-elements 14*c* are substantially identical to the outlet openings 74 of the second sub-elements 14*b* and to one another. The inlet openings 82 are aligned generally along the y-axis, i.e., have the same y-position, in the previously-defined x-y-z coordinate system. The inlet openings 82 therefore have the same position along the y-axis and z-axis. The conduits 86 and outlet openings 84 are also substantially identical in cross-section to one another and to the rectangular or square inlet openings 82. The conduits 86 have substantially the same length along the z-axis.

The branch streams 44a, 44b in the third sub-elements 14c proceed from the inlet openings 82, through the conduits 86, and finally to the outlet openings 84. The conduits 86 act as means for redirecting or repositioning each of the branch streams 44a, 44b with respect to the y-axis only. The general direction and degree of displacement associated with each conduit 86 is indicated by the arrows 89 in FIG. 7. In one example, the conduit 86 of the flow path 12a directs the branch stream 44a in an upward direction along the y-axis as viewed in FIG. 7, while the conduit 86 of the flow path 12b directs the branch stream 44b in a downward direction along the y-axis as viewed in FIG. 7 to place the branch stream 44a above the branch stream 44b relative to the y-axis. The repositioning of the branch streams 44a, 44b along the y-axis by the third sub-elements 14c is effected without substantially changing or distorting the cross-sections of the branch streams such as rotating the laminae within a given branch stream relative to the laminae of another branch stream. The redirected and repositioned branch streams 44a, 44b arrive at the outlet openings 84 of the third sub-elements 14c with different positions along y-axis relative to the positions of the branch streams along the y-axis at the inlet openings 82.

Figure 8:
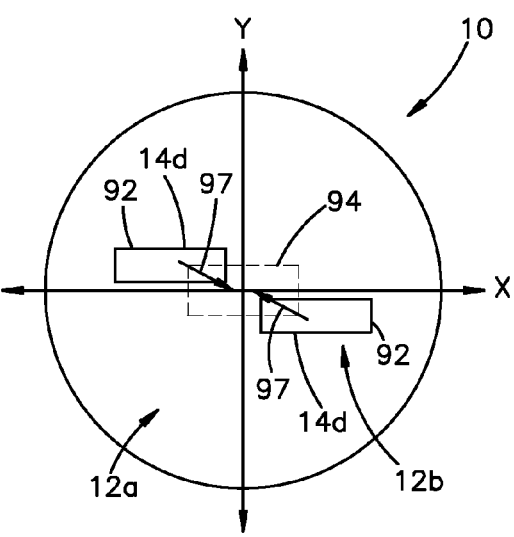
FIG. 8 is a cross-sectional view in isolation of a fourth sub-element of the die of FIG. 1, taken from the front or upstream side of the fourth sub-element.

The outlet openings 84 from the third sub-elements 14c communicate with inlet openings 92 of the fourth sub-elements 14d (FIG. 8). Conduits 96 (see FIG. 1) of the third sub-elements 14c connect the inlet openings 92 to outlet openings 94. The inlet openings 92 of the fourth sub-elements 14d are substantially identical in cross-section to the outlet openings 84 of the third sub-elements 14c and to one another. The conduits 96 of the fourth sub-elements 14d 1) redirect and reposition each branch stream 44a, 44b with respect to both the x-axis and the y-axis and 2) merge to a single conduit 99 that recombines the branch streams in overlapping relationship along the y-axis (see FIG. 4). The general direction and degree of displacement associated with each conduit 96 is indicated by the arrows 97 in FIG. 8. The branch streams 44a, 44b are therefore conveyed through conduits 96 of the fourth sub-elements 14d from the inlet openings 92 to the single outlet opening 94.

Figure 9:
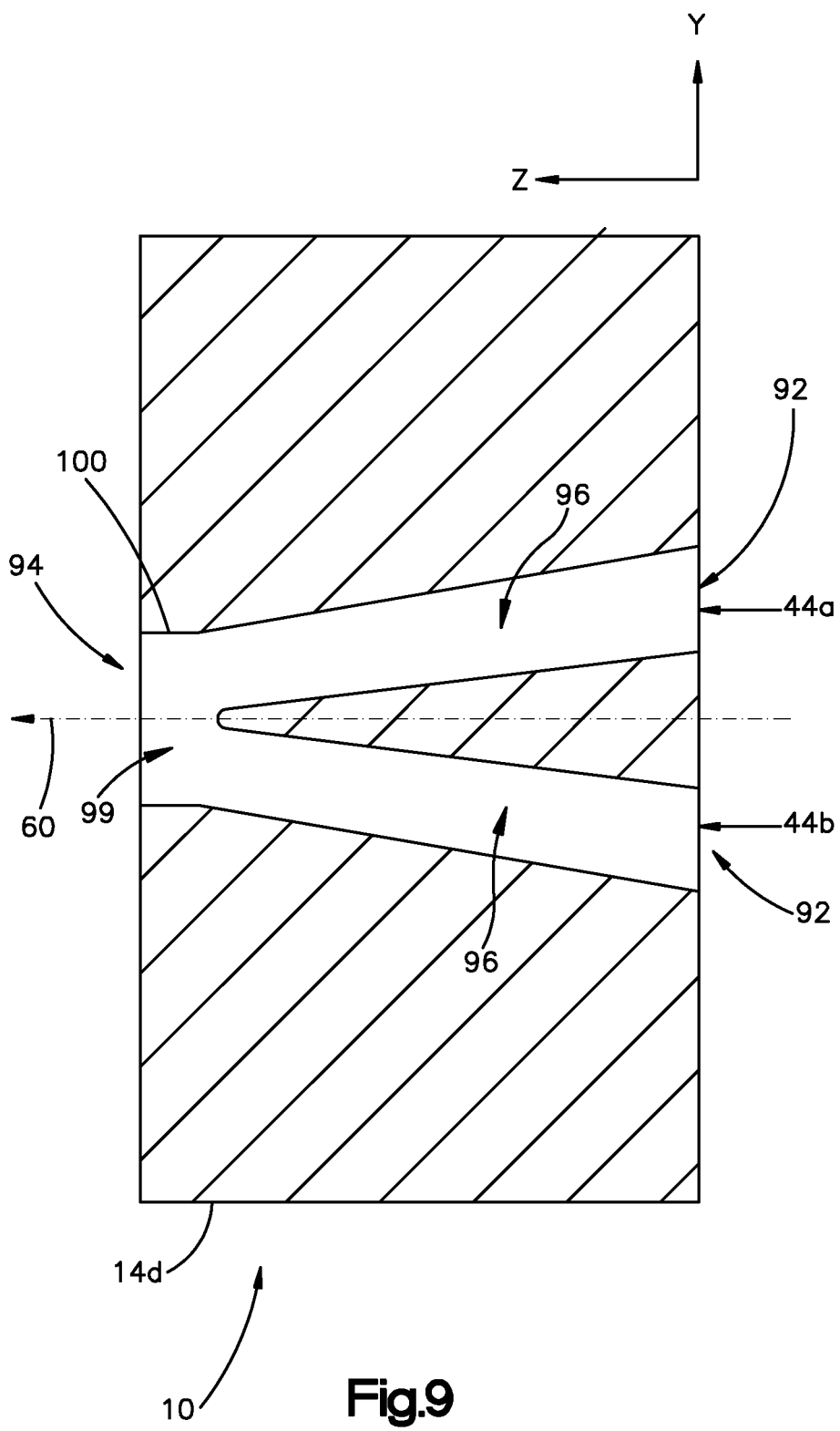
FIG. 9 is a view in cross-section of the convergence of conduits in the fourth sub-element of the die of FIG. 1 toward a common exit.

Referring to FIG. 9, the conduits 96 of the fourth sub-elements 14d have a constant transverse or x-dimension and direct the branch streams 44a, 44b passing therethrough from the inlet openings 92 toward the single outlet opening 94, which merges the branch streams into the second composite stream 60. The conduits 96 are angled towards one another relative to the x-axis and the y-axis as the conduits extend along the z-axis until merging to form the conduit 99. The conduit 99 cooperates with the outlet opening 94 to merge the branch streams 44a, 44b into the second composite stream 60.

The common outlet opening 94 (FIG. 8) of the fourth sub-elements 14d may have substantially the same overall dimensions in the x- and y-directions, i.e., the same perimeter length, as the combined overall dimensions in the x- and y-directions of the inlet openings 62 of the first sub-elements 14a (see FIG. 5). Accordingly, the branch streams 44a, 44b entering the inlet openings 62 of the first sub-elements 14a have substantially the same cross-sectional area as the second composite stream 60 exiting the outlet opening 99. In any case, a portion of the conduit 99 of the fourth sub-elements 14d forms a flat die-land 100 that allows the material of the expanded, contracted, and recombined second composite stream 60 to relax and relieve stress before the second composite stream passes through the exit opening 94 to be recombined or combined with composite stream(s) exiting other multiplier dies in series or in parallel with one another (not shown).

In designing the multiplying die 10 of the present invention, it may be desirable to have the branch streams 44a, 44b or second composite stream 60 manipulated in a gradual manner. Where space for the die 10 is limited, however, or where there is the potential for degradation of some of the materials in the first composite stream 40 in passing through the feedblock apparatus and one or more of the present dies, manipulation of the first composite stream to the second composite stream 60 may be configured to be more abrupt. For example, the overall length of the various sub-elements 14a-d required in combination to create the desired number of layers (A) and (B) and layer interfaces 42 in the second composite stream 60 may be reduced.

Figure 10:
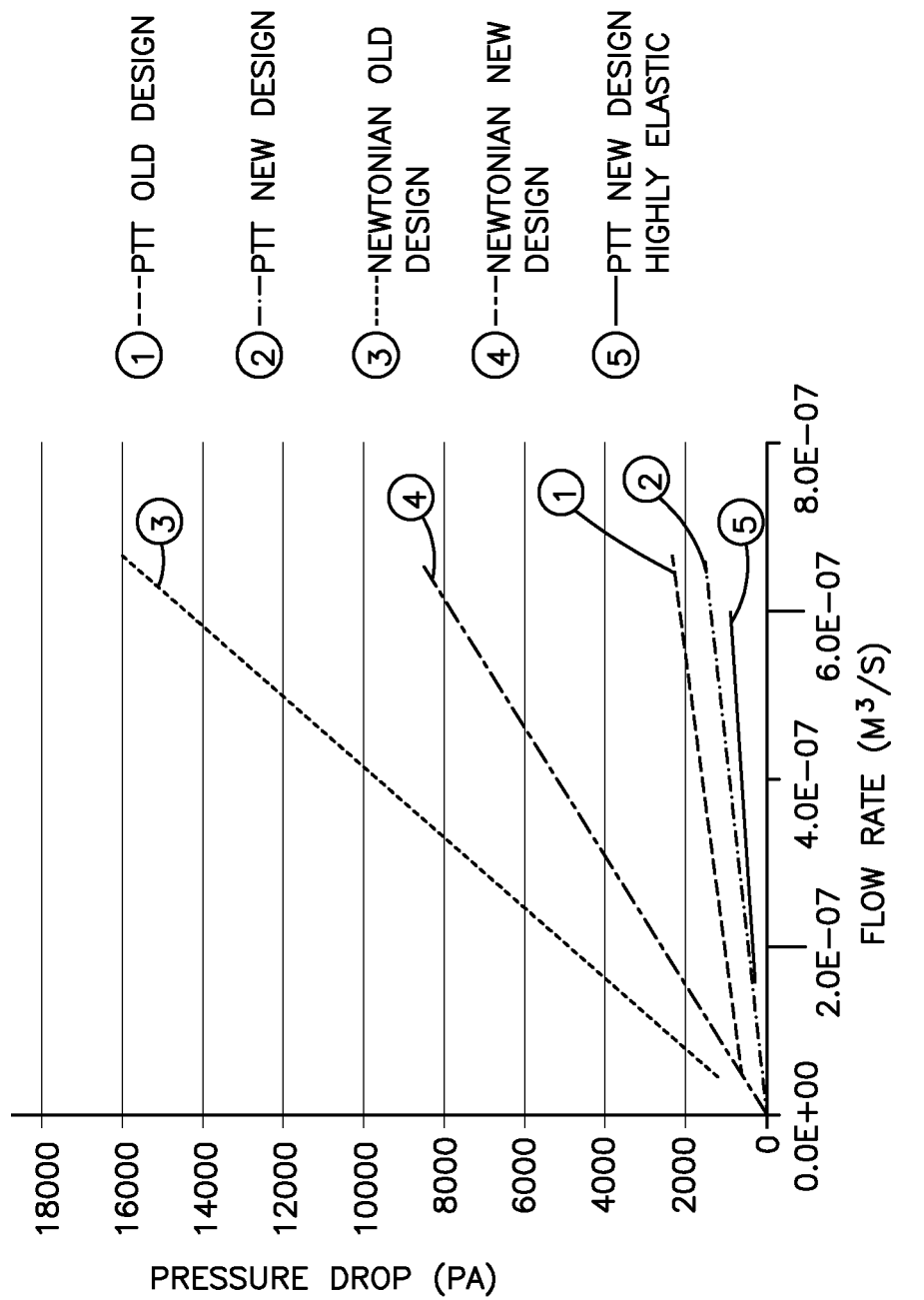
FIG. 10 is a graph illustrating the pressure drop across the multiplier die of FIG. 1 over an array of material flow rates through the die.

In previous dies, the expansions and contractions of the incoming composite stream were not performed simultaneously. Such a step-wise manipulation of the composite stream results, however, in a large pressure drop across the entire die, which leads to undesirable results, e.g., interfacial instabilities. On the other hand, in the present invention, each branch stream 44a, 44b is separately expanded and contracted simultaneously and symmetrically prior to recombining the branch streams. Consequently, the pressure drop across the entire die 10 can be reduced to favorable levels compared to prior dies. A comparison of the pressure drops experienced in various dies using various materials is illustrated in FIG. 10. More specifically, the multiplier die 10 of the present invention exhibits approximately a 40-50% decrease in pressure drop across the entire die when compared to prior multiplier dies. Experimental data showed similar results in both compatible and incompatible material displaying a 35-50% pressure drop decrease through the multipliers.

The multiplier die 10 of the present invention is also advantageous because the velocity profile along the cross-section of the conduits is homogenized. By accomplishing these objectives, interfacial instabilities between the layers (A) and (B) of the first composite stream 40 can be reduced or avoided. These instabilities are also reduced or avoided by keeping the cross-sectional area of the branch streams 44a, 44b in the x-y plane constant or substantially constant along the length of each flow path 12a, 12b. For that purpose, the contractions and expansions are realized separately in each branch stream 44a, 44b simultaneously. As noted, this method of creating interfacial surfaces 42 also allows the material of the second composite stream 60 to relax following expansion/contraction before recombination of the branch streams 44a, 44b by means of the flat die land 100 (FIG. 9) at the exit opening 94 of the fourth sub-elements 14d.

Furthermore, in contrast to previous layer-multiplying, co-extrusion dies in which a relatively narrow range of base materials may be used, the multiplier die 10 of the present invention increases uniformity in the layers (A) and (B) to allow for the fabrication of a new range of materials with improved properties. Such an invention is particularly useful in the co-extrusion of relatively high elastic materials and polymers, e.g., a rubber, in which the material properties such as viscosity and rheological behaviors do not match.

There are a number of options with regard to the design and employment of the multiplier dies 10 of the present invention under such circumstances, including employing elements constructed according to the teaching of the present invention but with a greater number of sub-elements than the four exemplified herein, shortening one or more of the sub-elements, changing the feedblock, or a combination of one or more of these options.

The preferred embodiments of the invention have been illustrated and described in detail. However, the present invention is not to be considered limited to the precise construction disclosed. Various adaptations, modifications and uses of the invention may occur to those skilled in the art to which the invention relates and the intention is to cover hereby all such adaptations, modifications, and uses which fall within the spirit or scope of the appended claims.

Having described the invention, the following is claimed:

1. A method for generating interfacial surfaces within a first composite stream comprised of discrete overlapping layers of polymeric material, a pair of such discrete overlapping layers defining a generally planar layer interface therebetween which lies generally in an x-z plane of an x-y-z coordinate system, wherein the z-axis extends in the general direction of flow of the first composite stream, the x-axis extends transversely of the first composite stream and defines a width dimension of the first composite stream and the pair of discrete overlapping layers, and the y-axis extends perpendicularly away from the planar layer interface and defines a thickness dimension of the first composite stream and the pair of discrete overlapping layers, the method comprising the steps of:
   (i) dividing the first composite stream into a plurality of branch streams along the x-axis such that the pair of discrete overlapping layers and the generally planar layer interface defined therebetween are distributed among at least two of the branch streams;
   (ii) within each individual branch stream of the at least two branch streams, expanding the width dimension of the branch stream along the x-axis and simultaneously contracting the thickness dimension of the branch stream along the y-axis; and
   (iii) recombining the branch streams, after simultaneously expanding and contracting each of the at least two branch streams, in an overlapping relationship to form a second composite stream which comprises a greater number of discrete overlapping layers of polymeric material than the first composite stream, wherein collectively steps (i)-(iii) have a homogenized velocity profile.

2. The method of claim 1, wherein expansion of the branch streams along the x-axis is uniform and contraction of the branch streams along the y-axis is uniform.

3. The method of claim 1 further comprising repositioning the branch streams along the x-axis as the branch streams flow along the z-axis prior to simultaneously expanding and contracting the branch streams.

4. The method of claim 1 further comprising repositioning the expanded and contracted branch streams along both the x-axis and y-axis prior to recombining the branch streams in an overlapping relationship.

5. The method of claim 4, wherein the expanded and contracted branch streams are positioned in a stacked configuration along the y-axis prior to being recombined.

6. The method of claim 1, wherein the branch streams are recombined by simultaneously directing the expanded and contracted branch streams towards one another along the x-axis and the y-axis.

7. The method of claim 1, wherein the first composite stream includes a single planar layer interface and the second composite stream includes three planar layer interfaces.

8. The method of claim 1, wherein the branch streams are expanded along the x-axis an amount that is inversely proportionate to the amount the branch streams are contracted along the y-axis.

9. The method of claim 1 further comprising maintaining the cross-sectional area of the branch streams during each of steps (i)-(iii) at a substantially constant amount.

10. The method of claim 1, wherein the first composite stream is divided into substantially identical branch streams each of which has one of a rectangular or square cross-section.

11. The method of claim 1, further comprising providing a die for multiplying the planar layer interface between discrete overlapping polymeric layers of the first composite stream, the die comprising:
   a first sub-element having conduits for dividing the composite stream into branch streams;
   a second sub-element having tapered conduits, each tapered conduit receiving the corresponding branch stream and simultaneously expanding the corresponding branch stream along the x-axis and contracting the corresponding branch stream along the y-axis;
   a third sub-element having conduits for recombining the branch streams in an overlapping relationship, after the branch streams are simultaneously expanded and contracted, to form the second composite stream having a greater number of discrete overlapping layers of polymeric material than the first composite stream.

12. The method of claim 11, wherein the die further comprising a fourth sub-element positioned between the second sub-element and the third sub-element, the fourth sub-element having conduits for repositioning the expanded/contracted branch streams along the y-axis.

13. The method of claim 11, wherein each conduit of the second sub-element tapers uniformly outwardly along the x-axis and tapers uniformly inwardly along the y-axis.

14. The method of claim 10, wherein the conduits of the third sub-element merge to a single conduit within the third sub-element for merging the branch streams into the second composite stream.

15. The method of claim 11, wherein the single conduit of the third sub-element includes a flat land extending parallel to the z-axis for relieving stress on the second composite stream.

16. The method of claim 11, wherein the first composite stream includes a single planar layer interface and the second composite stream includes three planar layer interfaces.

17. The method of claim 11, wherein the cross-sectional area of each tapered conduit of the second sub-element is substantially constant along the entire length of the tapered conduit in the z-direction.

18. The method of claim 1, wherein the branch streams are expanded along the x-axis an amount that is inversely disproportionate to the amount the branch streams are contracted along the y-axis.

19. The method of claim 1, wherein the first composite stream includes at least one highly elastic material.

20. The method of claim 1, wherein the first composite stream includes rubber.

21. The method of claim 1, wherein the first composite stream includes two materials having different viscosities.

* * * * *